United States Patent
Fritz et al.

[11] Patent Number: 5,983,941
[45] Date of Patent: Nov. 16, 1999

[54] MULTIPLE-WAY VALVE

[75] Inventors: Carsten Fritz, Hannover; Franz Rieck, Burgdorf, both of Germany

[73] Assignee: Nass Magnet GmbH, Hannover, Germany

[21] Appl. No.: 09/044,290

[22] Filed: Mar. 19, 1998

[30] Foreign Application Priority Data

Apr. 30, 1997 [DE] Germany ............... 197 18 408

[51] Int. Cl.⁶ .................... F15B 13/044; F16K 11/052
[52] U.S. Cl. ................. 137/625.65; 137/625.44
[58] Field of Search ............... 137/625.44, 625.65

[56] References Cited

U.S. PATENT DOCUMENTS

| | | | |
|---|---|---|---|
| 3,960,361 | 6/1976 | York | 137/625.65 X |
| 3,991,788 | 11/1976 | Kull | 137/870 X |
| 4,617,969 | 10/1986 | Weiger et al. | 251/129.06 X |
| 5,653,422 | 8/1997 | Pieloth et al. | 137/625.44 X |

FOREIGN PATENT DOCUMENTS

4405657A1  8/1995  Germany .

*Primary Examiner*—Gerald A. Michalsky
*Attorney, Agent, or Firm*—Reising, Ethington, Barnes, Kisselle, Learman & McCulloch, P.C.

[57] ABSTRACT

A multiple-way valve having a housing forming a chamber with which two spaced apart fluid ports communicate. An actuator is accommodated in the chamber and has two spaced apart closures which are operable to open and close the ports. The actuator is biased to a position in which one port is closed and the other port is open but the actuator may be rocked in response to energization of an electromagnet to a position in which the one port is closed and the other port open. In moving from either position to the other the actuator rocks first about one fulcrum and then about a second fulcrum. The two fulcrums are so located as to facilitate initial movement of the actuator from either of its positions thereby minimizing the power required to be applied by the electromagnet.

15 Claims, 4 Drawing Sheets

MULTIPLE-WAY VALVE

The invention relates to a multiple-way valve.

BACKGROUND OF THE INVENTION

A multiple-way valve which is constructed as a solenoid valve is known from DE-A-44 05 657. It consists essentially of a valve housing in which a first and a second valve seat are constructed, and an actuating element which has a first and a second closure member each co-operating with one of the two valve seats and is pivotably mounted in such a way that in a first setting position the first closure member comes into contact with the first valve seat and in the second setting position the second closure member comes into contact with the second valve seat. In this case the actuating element is constructed as a tilting armature which can be pivoted between the two setting positions by control of an electromagnet and a restoring spring.

Depending upon the use of the valve and the prevailing pressure conditions, in certain circumstances a substantially higher force is necessary in the case of one closure member by comparison with the other closure member in order to lift it off its valve seat. In many applications, however, it is necessary for both closure members to be raised with approximately the same travel in order to keep the air venting times low.

Therefore with frequent switching of the electromagnet a relatively high power is necessary.

The object of the invention, therefore, is to improve the known multiple-way valve in such a way that the switching is facilitated with a lower power.

SUMMARY OF THE INVENTION

According to the invention this object is achieved by the provision of an actuating element having two pivot axes, or fulcrums, and wherein the actuating element when pivoting from one setting position to the other first of all rotates about one pivot axis and then about the other. In this case the pivot axes are disposed so that the first pivot axis ensures a larger lever arm and thereby a greater force for lifting the closure member off from the valve seat, whilst the second pivot axis facilitates sufficient travel of the closure member.

THE DRAWINGS

Further embodiments and advantages of the invention are explained in greater detail with reference to the description of an embodiment and the drawings, in which:

FIG. 1 shows a partially sectional representation of an embodiment of the invention with an electromagnet as actuating arrangement, FIGS. 2 to 4 show sectional details in the region of the valve housing with various positions of the actuating element.

DETAILED DESCRIPTION

Figure 1:
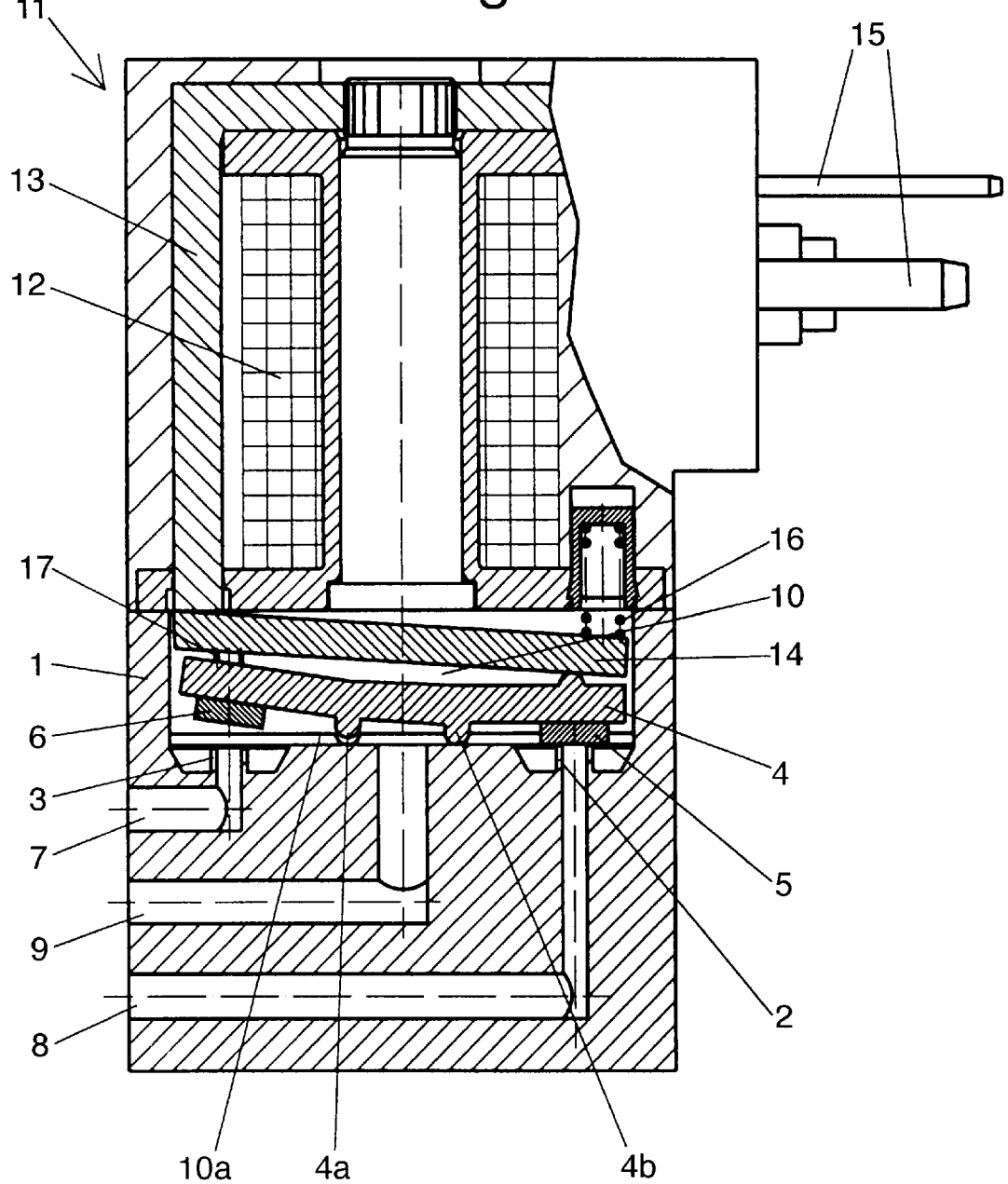

In FIG. 1 a multiple-way valve according to the invention is shown by way of example as a 3/2-way solenoid valve.

It has a valve housing 1 with a valve chamber 10 in which a first and a second valve seat 2, 3 are constructed. A rockable actuating element 4 is also provided which has a first and a second closure member 5, 6 each co-operating with one of the two valve seats 2, 3 and which is pivotably mounted in such a way that in a first setting position (FIG. 2) the first closure member 5 comes into contact with the first valve seat 2 and in the second setting position (FIG. 4) the second closure member 6 comes into contact with the second valve seat 3. The two closure members 5, 6 are constructed in such a way that they ensure sufficient sealing on their respective valve seats 2, 3.

The valve housing 1 also has an air vent port 7, a pressure connection 8 and a working port 9, the air vent port 7 opening on the second valve seat 3 and the pressure port 8 opening on the first valve seat 2 in the valve chamber 10. The two valve seats 2, 3 are disposed in the region of a base 10a of the valve chamber 10. The working port 9 also opens in this base. Thus the illustrated multiple-way valve produces the communication between the air vent port 7 and the working connection 9 or between the pressure port 8 and the working connection 9 as required.

The actuating element 4 is constructed in the form of a bar and is supported on the base 10a of the valve chamber 10 by way of at least one of two projections 4a, 4b. The two closure members 5, 6 are in each case mounted on an end region on the side of the actuating element facing the base 10a. The actuating element 4 is slightly curved or bent, so that in both setting positions in each case one closure member rests tight on the appertaining valve seat and the other closure member is lifted off from its valve seat with sufficient travel. The projections 4a, 4b supported on the base 10a form the two fulcrums or pivot axes of the actuating element, the actuating element rocking first about one pivot axis and then about the other when pivoting from one setting position to the other.

The pivoting operation of the actuating element is controlled by actuating apparatus which co-operates therewith. In the illustrated embodiment the actuating apparatus is formed for example by an electromagnet 11 which consists essentially of a magnet coil 12, a yoke 13 and a tilting armature 14. The electromagnet 11 is excited by way of connections 15, so that the tilting armature 14 is then tilted up onto the electromagnet 11 from its tilted-down position in FIG. 1 against the force of a spring element 16.

Therefore in order to carry out the tilting movement the tilting armature is held at its end remote from the spring element 16 so as to be pivotable in a suitable manner.

In the region of its free end the tilting armature 14 is in contact with the actuating element 4 on its side remote from the electromagnet 11. Without excitation of the electromagnet 11, the tilting armature 14 is tilted down by the spring element 16, the tilting armature 14 pressing the closure member 5 onto its valve seat 2 by way of the actuating element 4.

When the electromagnet 11 is excited the tilting armature 14 is tilted up onto the electromagnet 11 against the force of the spring element 16, so that the actuating element 4 pivots by means of a further spring element 17 into the second setting position in which the second closure member 6 comes into contact with the second valve seat 3.

The pivoting operation is explained again in greater detail below with reference to FIGS. 2 to 4.

The normal or inactive position of the actuating element 4 corresponds to the position according to FIG. 1 in which the electromagnet 11 is currentless. FIG. 3 shows an intermediate position in which the tilting armature is already partially tilted up. In this intermediate position the actuating element 4 is supported by both projections 4a, 4b and both closure members 5, 6 are lifted off from their valve seats 2, 3. Finally in FIG. 4 the second setting position is shown in which the tilting armature is tilted up onto the electromagnet 11.

Figure 2:
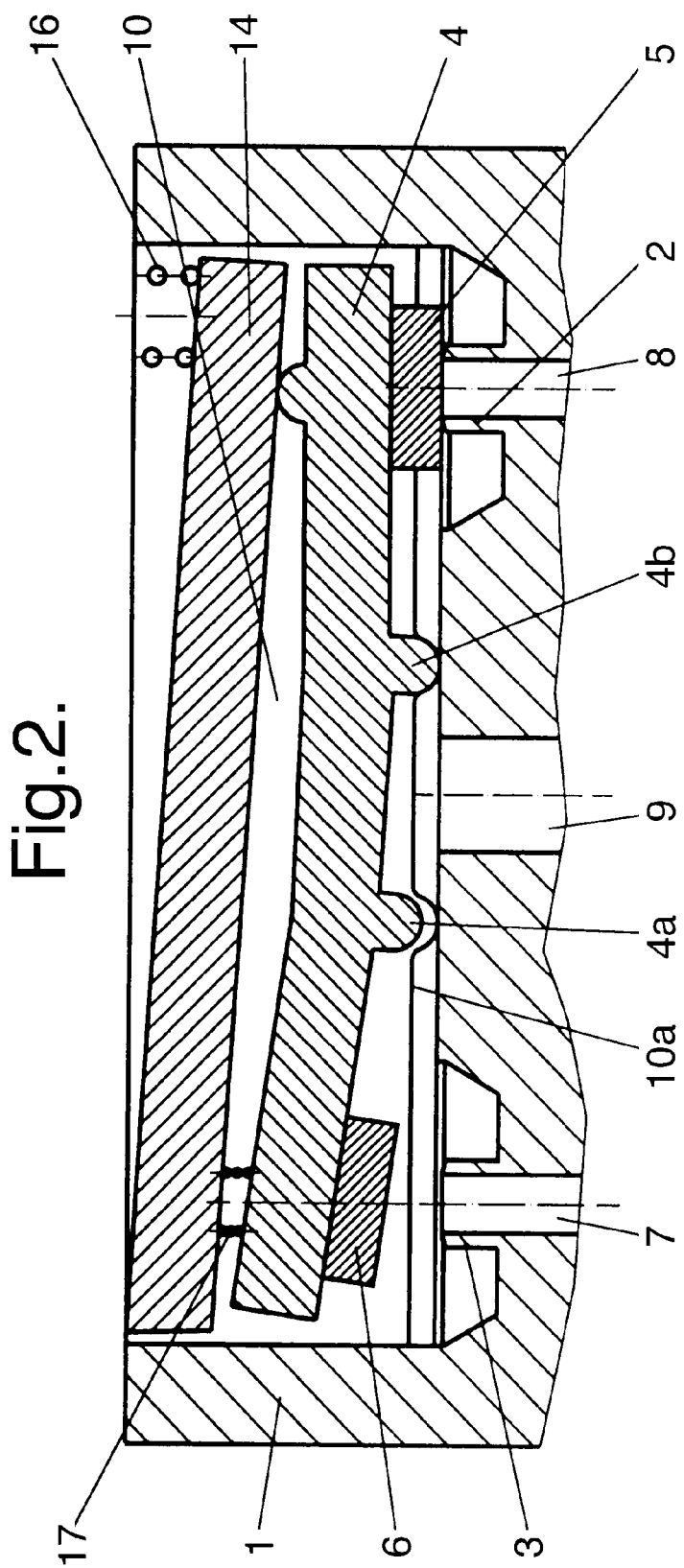
Figure 3:
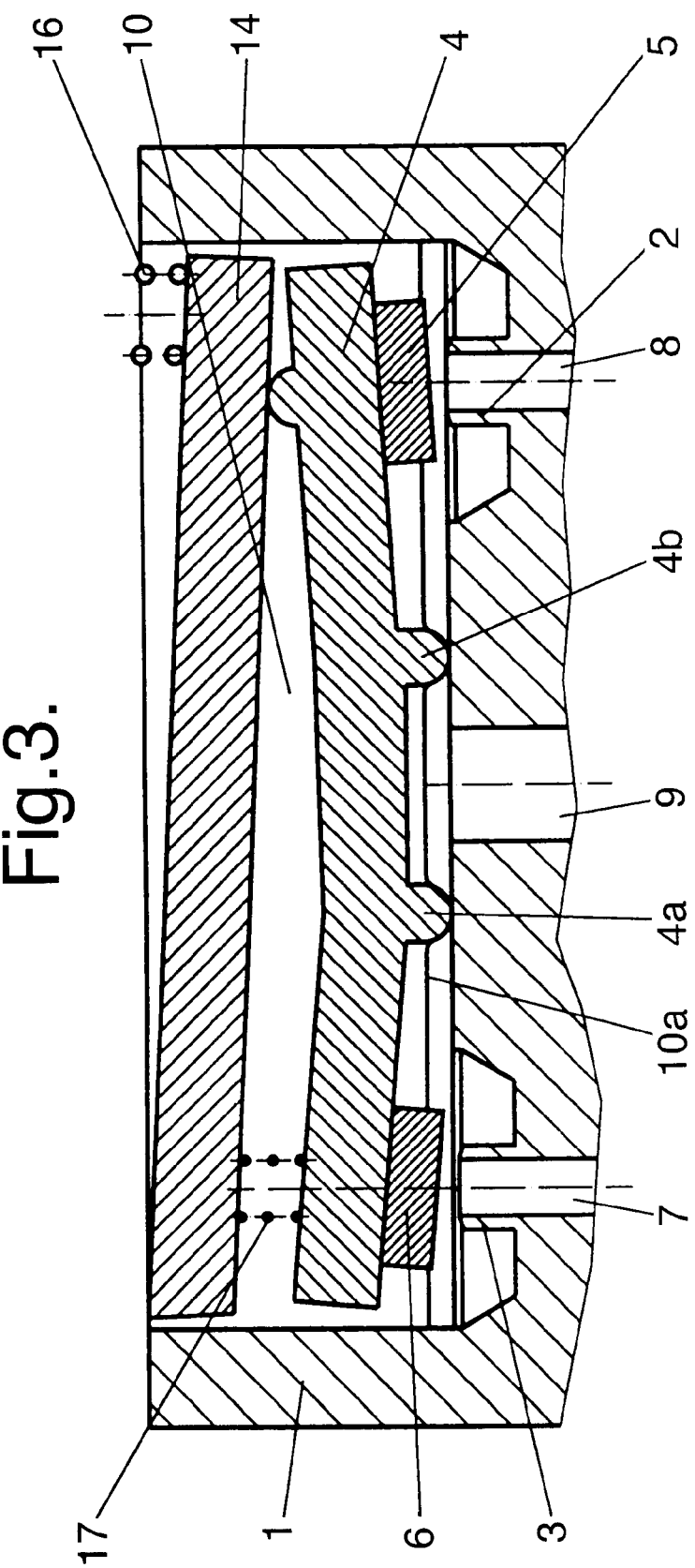
Figure 4:
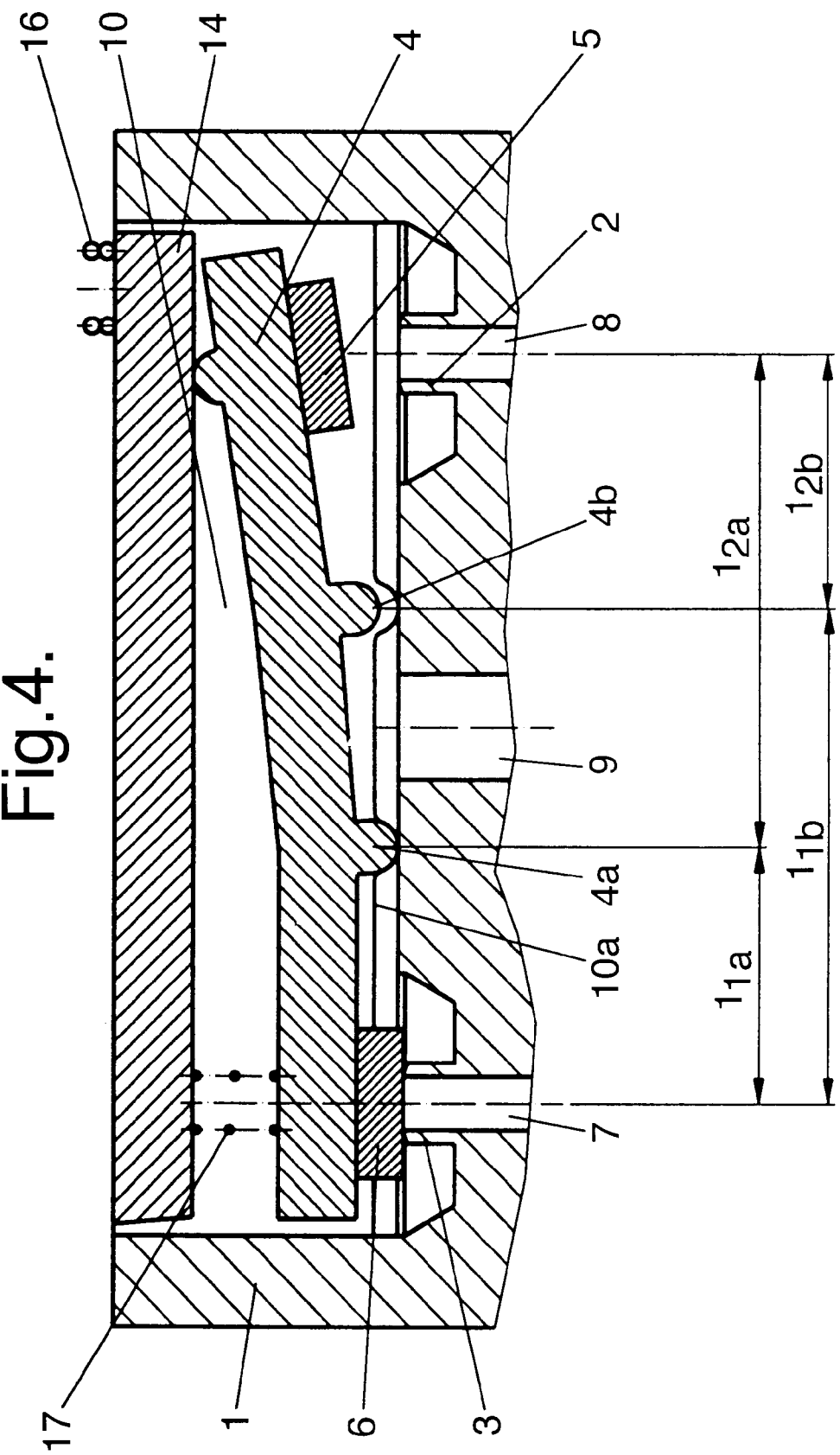

Accordingly, in order to proceed from the first setting position according to FIG. 2 to the second setting position according to FIG. 4, the electromagnet must merely tilt the tilting armature 14 counterclockwise. In this case the power of the electromagnet must be chosen to be of such a magnitude that the force component of the spring element 16 which counteracts this movement is overcome. However, the actual pivoting work is essentially provided by the further spring element 17.

Therefore means for generating a force component which acts on the actuating element are provided on both end regions of the actuating element 4. In the end region having the first closure member 5 these means are formed by the tilting armature 14 and the spring element 16 and in the end region having the second closure member 6 these means are formed by the further spring element 17.

In the pivoting operation the actuating element 4 acts as a double-ended lever having two pivot axes which are disposed between the means for generating a force component acting on the actuating element 4 and are formed by the two projections 4a, 4b of the actuating element 4 which are supported on the base 10a. In the illustrated embodiment the base 10a is constructed in the region of the projections 4a, 4b of the actuating element so as to have recesses complementary to the projections for the accommodation of the projections in order to assign a clear position to the actuating element 4 within the valve chamber 10.

In order to proceed from the first setting position shown in FIG. 2 to the second setting position shown in FIG. 4, first of all the projection 4b comes into effect as a pivot axis. This produces (according to FIG. 4) between the spring element 17 and the pivot axis 4b a lever arm $1_{1b}$ which is greater than the lever arm $1_{2b}$ formed between the pivot axis 4b and the first closure member 5.

As soon as the first closure member 5 has been lifted off somewhat from the first valve seat, fluid begins to flow through the pressure connection 8 into the chamber 10. At this stage the actuating element is located in the intermediate position shown in FIG. 3, in which the actuating element 4 is supported on both projections 4a, 4b. For the further pivoting operation the projection 4a now forms the effective pivot axis. The less favourable leverage resulting from this is, however, compensated by the fluid flow. Thus the lever arm $1_{1a}$ formed between the projection 4a and the spring element 17 is smaller than the lever arm $1_{2a}$ formed between the projection 4a and the first closure member 5. Because of the altered leverage the closure member 5 can travel further in the second part of the pivoting operation. Whilst the second closure member 5 is lifted off from its valve seat 2 with sufficient travel, the second closure member 6 seals the second valve seat 3.

In order to proceed again from the second setting position shown in FIG. 4 back to the first setting position according to FIG. 2, first of all the electromagnet 11 must be switched off, so that the tilting armature 14 is pressed downwards by the spring 16 and carries out the pivoting operation.

Thus the spring element 16 must overcome not only the prevailing pressure in the region of the second valve seat but also the force of the further spring element 17. Accordingly the spring element 16 must generate a greater force component. In this pivoting operation the two pivot axes of the actuating element 4 have a supporting effect.

As can be seen from FIG. 4, the projection 4a forms the pivot axis which is effective first of all, the lever arm $1_{2a}$ co-operating with the force of the spring element 16 being greater than the lever arm $1_{1a}$ formed between the pivot axis (projection 4a) and the second closure member 6.

In the intermediate position there is again an exchange of pivot axes, the fluid flow commencing at this time and thus reducing the force requirement.

Because of the favourable leverage produced by the two pivot axes the spring element 16 can be of smaller design. The electromagnet 11 only needs to be designed to be strong enough to be able to tilt the tilting armature 14 up against the force of the spring 16. Thus a spring element 16 with lower spring force also makes it possible to use an electromagnet with correspondingly reduced power.

We claim:

1. In a multiple-way valve having a housing, first and second spaced apart fluid ports, an actuating member having first and second closure members for respectively opening and closing said first and second ports, means mounting said actuating member for rocking movements between a first position in which said first port is closed by said first closure member and said second port is open to a second position in which said second port is closed by said second closure member and said first port is open, and means for rocking said actuating member between said positions, the improvement wherein the means mounting said actuating member for rocking movements comprises first and second spaced apart fulcrums about each of which said actuating member is rockable, both of said fulcrums being between said first and second closure members, said first fulcrum being closer to said first port then said second fulcrum and said second fulcrum being closer to said second port than first fulcrum, rocking movement of said actuating member from said first position toward said second position first occurring only about said first fulcrum and then only about said second fulcrum.

2. The valve according to claim 1 wherein each of said fulcrums is carried by said actuating member.

3. The valve according to claim 1 wherein said actuating member is bent between its opposite ends.

4. The valve according to claim 1 including a first spring exerting a force on said actuating member for yieldably biasing said actuating member in a direction to enable said first closure member to close said first port.

5. The valve according to claim 4 including a second spring exerting a force on said actuating member for yieldably biasing said actuating member in a direction to enable said second closure member to close said second port.

6. The valve according to claim 5 wherein said second spring has a strength less than that of said first spring.

7. The valve according to claim 6 wherein the means for rocking said actuating member includes an electromagnet having an armature bearing upon said actuating member, said electromagnet being operable to overcome the force of said first spring and initiate rocking movement of said actuating member from said first position toward said second position.

8. The valve according to claim 7 wherein said second spring exerts its force on said actuating member in a direction to overcome the force of said first spring.

9. The valve according to claim 1 wherein said fulcrums are formed by projections carried by and extending beyond said actuating member, the projection forming said first fulcrum being movable into and out of a first recess in said housing and the projection forming said second fulcrum being movable into and out of a second recess in said housing.

10. The valve according to claim 1 wherein the means for rocking said actuating member comprises an energizable and deenergizable electromagnet having a tilting armature tiltable in opposite directions in response to energization and deenergization of said electromagnet, said tilting armature acting on said actuating member to initiate movement of said actuating member from said first position toward said second position in response to energization of said electromagnet and acting on said actuating member in response to deenergization of said electromagnet to initiate movement of said actuating member from said second position toward said first position.

11. The valve according to claim 1 wherein said housing has a chamber with which said ports communicate and within which said actuating member is accommodated.

12. The valve according to claim 11 wherein said actuating member has two projections forming said first and second fulcrums, said chamber having a wall confronting said actuating member, said wall having two recesses therein for the removable accommodation of said projections.

13. The valve according to claim 1 wherein during rocking movement of said actuating member between said first and second positions said actuating member passes through an intermediate position in which both of said ports are open.

14. A valve comprising a housing having a chamber therein; first and second spaced apart fluid ports communicating with said chamber; an actuator having closure members thereon for opening and closing said ports; means mounting said actuator for rocking movements about each of two fulcrums from a first position in which one of said ports is closed by one of said closures and the other of said ports is open, to a second position in which said one of said ports is open and the other of said ports is closed by the other of said closures; first spring means biasing said actuator toward said first position; second spring means biasing said actuator toward said second position; and energizable and deenergizable electromagnet means operable when energized to overcome the bias of said first spring means and rock said actuator sequentially about said first and second fulcrums from said first position to said second position, said first spring means being of such strength as to overcome the bias of said second spring means when said electromagnetic means is deenergized and rock said actuator sequentially about said second and first fulcrums from said second position to said first position.

15. The valve according to claim 4 wherein said actuator comprises a bar and wherein said closure members are mounted adjacent opposite ends of said bar, the distance between said first closure and said first fulcrum being less than the distance between said first closure and said second fulcrum and the distance between said second fulcrum and said second closure being less than the distance between said second closure and said first fulcrum.

* * * * *

UNITED STATES PATENT AND TRADEMARK OFFICE
CERTIFICATE OF CORRECTION

PATENT NO. : 5,983,941
DATED : November 16, 1999
INVENTOR(S) : Carsten Fritz & Franz Rieck It is certified that error appears in the above-identified patent and that said Letters Patent is hereby corrected as shown below:

Column 2, line 7, change "connection" to --port--. (1st occurr.)

Column 2, line 14, change "connection" to --port--.

Column 2, line 15, change "connection" to --port--.

Claim 15, change "4" to --14--.

Signed and Sealed this

Thirtieth Day of May, 2000

Attest:

Q. TODD DICKINSON

*Attesting Officer*     *Director of Patents and Trademarks*